Sept. 15, 1925.

K. BECKER

SLIDE RULE

Filed April 14, 1924

1,554,176

Inventor:

Patented Sept. 15, 1925.

1,554,176

UNITED STATES PATENT OFFICE.

KONRAD BECKER, OF HAMMER, GERMANY, ASSIGNOR TO J. B. SOELLNER NACHF. REISSZEUGFABRIK A.-G., OF NUREMBERG, GERMANY.

SLIDE RULE.

Application filed April 14, 1924. Serial No. 706,599½.

*To all whom it may concern:*

Be it known that I, KONRAD BECKER, a citizen of the German Republic, residing at Hammer, Germany, have invented certain new and useful Improvements in Slide Rules, of which the following is a specification.

This invention relates to a slide rule which differs from instruments of this kind of known type in that the slide has at each side two tongues of wedge-shaped cross section engaging with correspondingly shaped grooves of the slide body.

Slide rules with dove-tailed shaped tongues and grooves have become known. The tongues according to the invention are however of wedge-shaped or triangular cross section so that the point of the wedge or triangle is turned towards the bottom of the groove and not away from the same as in the slide rules of known type. The grooves are constructed accordingly and get narrower towards the bottom but not larger as is the case in the slide rules of known type.

Owing to this improved construction two tongues and two grooves can be arranged on either side of the slide wherefrom results a very smooth movement of the slide in the body. Between the two parts a determined friction must exist. If the surfaces in contact are enlarged by the provision of two tongues and of two grooves the friction per unit of surface will be considerably less than in the slide rules of known type. A soft but well guided working of the slide in the body of the slide rule, even when the slide is pulled out almost entirely, is a condition which has to be fulfilled by a serviceable slide rule. This soft but well guided working can be obtained in metal slide rules only when tongue and groove are constructed according to the invention, two tongues and grooves being arranged on each side of the slide.

The wedge-shape of the groove and of the tongue according to the invention, prevents further the deposit of impurities between the slide and the slide body and facilitates the removal of the impurities.

A further advantage is that the tools for making the tongues and the grooves are more simple to produce than those for the production of the grooves and tongues of the commonly used type.

An embodiment of the invention is shown by way of example on the accompanying drawing, in which:—

Figure 1:
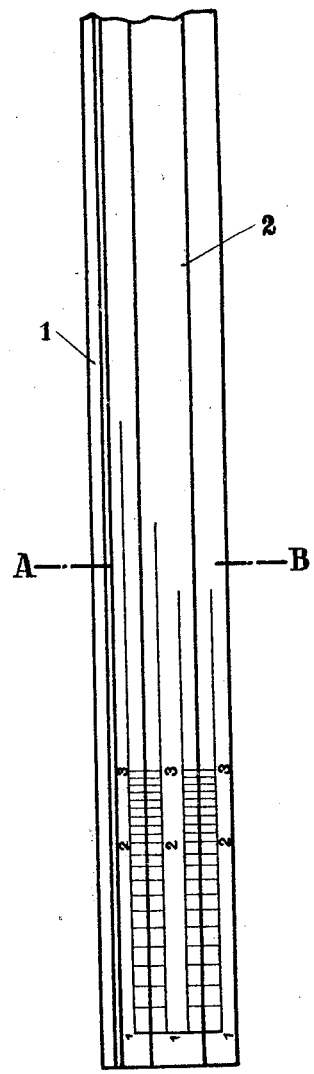
Fig. 1 shows the improved slide rule in plan view.
Figure 2:
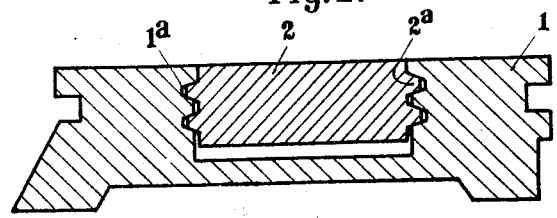
Fig. 2 is a cross section on line A—B of Fig. 1, on larger scale.

The body 1 of the slide rule and the slide 2 are made from metal, preferably from light metal as aluminum, electrone or the like and of the usual shape, with the exception of the sliding surfaces.

The slide 2 has at each side two tongues 2ª of wedge-shaped cross section and in each corresponding surface of the slide body 1 two grooves 1ª of wedge-shaped cross section are arranged.

The slide is thus guided in the slide body by four tongues and four grooves so that a much better and securer guiding is ensured than in the commonly used wooden slide rules having only one tongue and one groove on each side of the slide.

I claim:—

A slide rule comprising a slide body having two grooves of wedge-shape in each guiding surface and a slide having at each side two tongues of wedge-shaped cross section engaging with said grooves of the slide body.

In testimony whereof I affix my signature.

KONRAD BECKER.